United States Patent [19]

Moore

[11] 3,941,077
[45] Mar. 2, 1976

[54] SIGNAL DEVICE FOR DETECTING FILTER CONDITION

[76] Inventor: Robert M. Moore, 4695 S. Jason St., Englewood, Colo. 80110

[22] Filed: Feb. 25, 1974

[21] Appl. No.: 445,210

[52] U.S. Cl.............. 116/70; 116/112; 116/117 R
[51] Int. Cl.² ........................................ G01L 9/12
[58] Field of Search... 116/70, 112, 117 R, DIG. 25, 116/DIG. 42; 340/239 F; 55/274, DIG. 34; 73/419

[56] References Cited
UNITED STATES PATENTS

| | | | |
|---|---|---|---|
| 2,758,563 | 8/1956 | Bigelow | 116/112 |
| 3,028,009 | 4/1962 | Scavuzzo | 116/70 |
| 3,442,134 | 5/1969 | Bennett | 73/419 |
| 3,594,745 | 7/1971 | Nickels | 73/419 |

Primary Examiner—S. Clement Swisher
Assistant Examiner—Denis E. Corr
Attorney, Agent, or Firm—Bertha L. MacGregor

[57] ABSTRACT

Disclosed herein is a signal device for detecting the condition of a fluid line filter and automatically activating a signal indicating that the filter requires cleaning or replacement. The signal device may be built in or installed as an attachment in the fluid lines leading to and from a filter for removing moisture and/or contaminants from the line. The signal device comprises a piston housing containing a piston movable to signalling position in response to reduced fluid pressure adjacent one end of the piston resulting from reduced volume of fluid passing through the filter, locking means for retaining the piston in said signalling position, and signal actuating means activated by fluid pressure when the piston is in said signalling position. The signal may be visual or audible, actuated mechanically or electrically.

6 Claims, 10 Drawing Figures

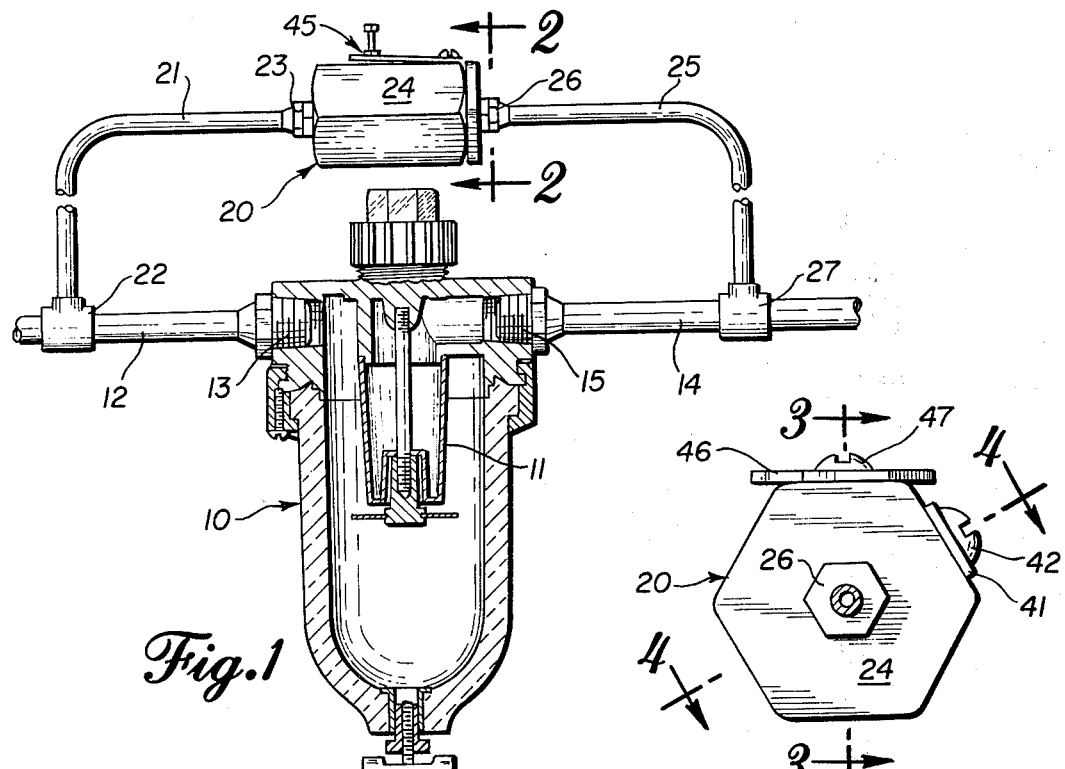
Fig.1
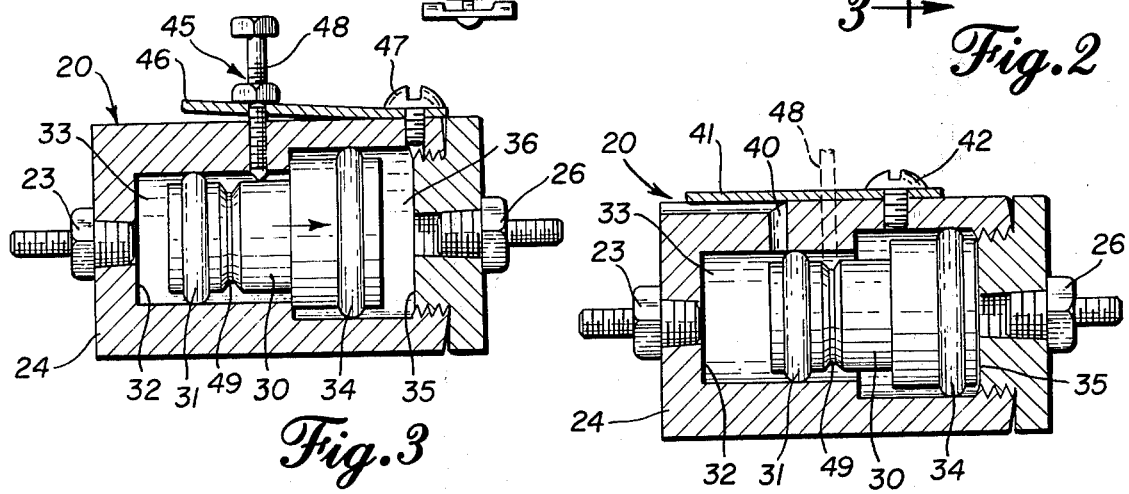
Fig.2
Fig.3
Fig.4
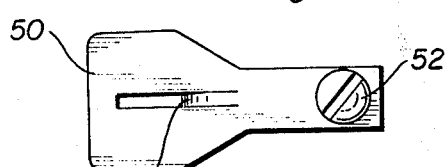
Fig.5
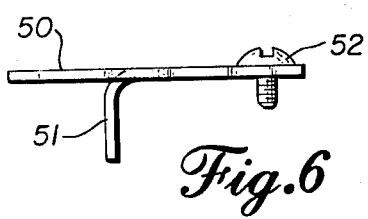
Fig.6
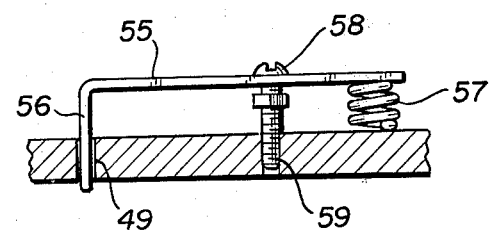
Fig.7

SIGNAL DEVICE FOR DETECTING FILTER CONDITION

This invention relates to a signal device for detecting the condition of a fluid line filter and automatically activating a signal indicating that the filter requires cleaning or replacement. It relates more particularly to a device easily attachable to the fluid line leading to and from a fluid line filter for the purpose of detecting the condition of the filter and automatically giving a signal, which may be audible or visual, in the event fluid flow through the filter is not normal, as is the case when the filter is clogged with contaminants.

Conventional pressurized fluid lines leading to fluid operated tools are provided with filters which remove moisture and contaminants. In order to avoid damage to the tools and devices being operated by the fluid line, and to insure maximum power and to avoid having to shut down fluid operated equipment at an inopportune time in the event the filter unit requires cleaning or replacement, it is desirable to provide a timely signal warning the operator of the filter condition.

The main object of this invention is to provide a signal which continues to function until the filter has been cleaned or replaced.

Another object is to provide a signal which becomes operative as soon as the filter becomes sufficiently clogged to hinder passage of pressurized fluid through the filter.

Another object is to provide a signal which may be audible or visual, and be mechanically or electrically activated.

Another object is to provide a signal device which detects filter condition in any pressurized fluid line, either water, air, oil or other fluid.

Another object is to provide a signal device piston which becomes activated by differential pressures transmitted to a piston housing by fluid lines connected, respectively, to the filter intake and the filter outlet lines. Adjustable means are provided for obtaining various differential pressures in a single signal device.

Another object is to provide locking means for retaining the signal device piston in its signalling position until the clogged condition of the filter has been corrected.

In the drawings:

FIG. 1 is an elevational view, partly in section, showing a fluid line filter equipped with a signal device embodying this invention for detecting the filter condition and sounding a signal if the filter is not functioning properly.

FIG. 2 is a transverse vertical sectional view of part of the signal device, in the plane of the line 2—2, looking in the direction indicated by the arrows.

FIG. 3 is a longitudinal vertical sectional view of the signal device, in the plane of the line 3—3 of FIG. 2, showing the position of the piston in the housing when the fluid flow through the filter is normal, indicating that the flow is not hindered by contaminants in the filter.

FIG. 4 is a view similar to FIG. 3, in the plane of the line 4—4 of FIG. 2, showing the position of the piston in the housing when the fluid flow through the filter is hindered by an unclean condition of the filter which causes the fluid flow into opposite ends of the piston housing to become unbalanced.

FIG. 5 is a plan view of a modification of the piston locking means of FIGS. 1–4.

FIG. 6 is an elevational side view of the locking means of FIG. 5.

FIG. 7 is a side elevational view of another modification of the locking means.

Figure 8:
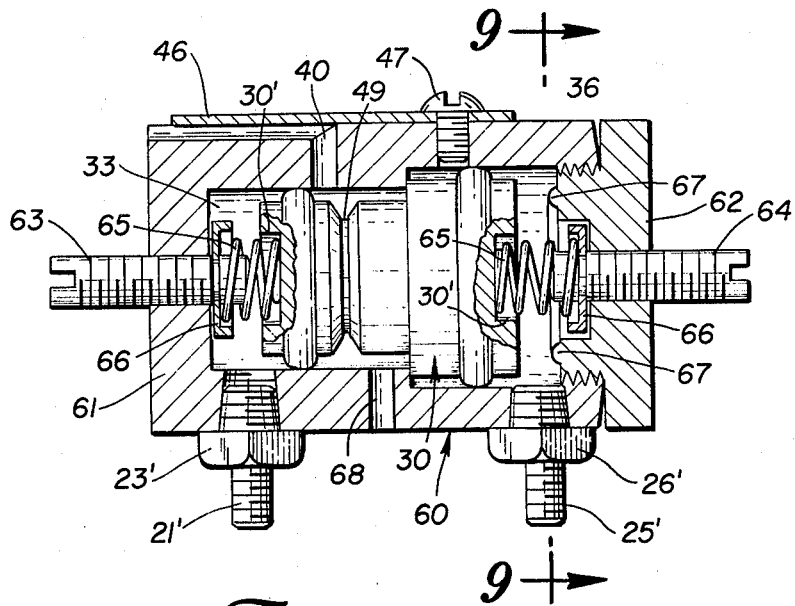
FIG. 8 is a longitudinal vertical sectional view of the piston housing, similar to FIG. 3, showing modifications related to means for varying the pressures required in the opposite end chambers to actuate the piston, whereby differentials may be obtained in a single signal device.

In the embodiment of the invention shown in the drawings, a conventional filter bowl 10, equipped with a fluid line filter 11, is connected in a fluid line which supplies pressurized fluid to fluid operated tools or devices (not shown). The fluid supply line 12 is connected at 13 to the filter bowl 10 for passage through the filter 11. The line 14 is connected at 15 to the filter bowl for passage of filtered fluid to the fluid operated tool.

The signal apparatus for detecting the filter condition and activating the signal when the filter has become clogged so that passage of pressurized fluid is hindered to a predetermined degree, is designated 20 as a whole. The apparatus 20 comprises a pressurized fluid intake 21 connected at 22 to the fluid supply line 12 and at 23 to a signal device housing 24, and fluid outlet 25 connected at 26 to the housing 24, and at 27 to the line 14 that leads to a fluid operated tool or device.

Referring to FIG. 3, the signal housing 24 encloses a piston 30 designed to move longitudinally axially in the housing 24 under certain conditions. Normally the smaller diameter end 31 is spaced from the housing end 32 by a high pressure fluid chamber 33, and the larger diameter piston end 34 is spaced from the housing end 35 by a low pressure fluid chamber 36. When the filter 11 is clean, or sufficiently clean to permit free passage of pressurized fluid through the filter and through lines 14 and 25, sufficient pressure exists in the low pressure chamber 36 to maintain the piston 30 in its normal position between chambers 33 and 36 as shown in FIG. 3.

When the filter 11 becomes clogged to such an extent that the pressurized fluid from supply line 12 does not pass freely through the filter, the lines 14 and 25 cease to provide sufficient fluid to maintain predetermined pressure in the chamber 36 and consequently the piston 30 is forced to move from the FIG. 3 position to that shown in FIG. 4 where the larger piston end 34 is near the end wall 35 of the piston housing. In the position of the piston 30 shown in FIG. 4, pressurized fluid in chamber 33 is free to pass out through duct 40 to activate a reed whistle 41 or other signal means fastened to the housing 24 by screw 42, as shown in FIGS. 2 and 4. Thus a signal is given when the filter needs cleaning or replacement, and this signal continues to be activated until the condition is corrected.

It is to be understood that the signal may be the audible signal shown in FIGS. 1–4, or a visual signal (electrical or mechanical) actuated by pressure fluid through the duct 40.

Figure 10:
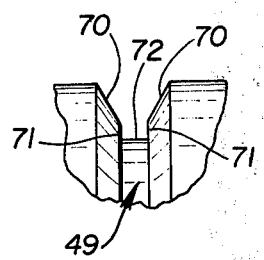
FIG. 10 is an enlarged sectional view showing the form of the annular groove in the piston.

To hold the piston in the signal-giving position shown in FIG. 4, there is provided locking means 45 shown in FIGS. 1–7. The means 45 comprises a spring plate 46 fastened at 47 to the housing 24, the plate having an aperture through which extends a headed screw 48 the inner end of which engages an annular groove 49 in the piston 30 when the piston has been forced into the FIG. 4 position by pressure in the chamber 33. The side walls of the groove 49 are shaped as best shown in FIG. 10 and the end of the screw 48 is retained therein until it is manually released by lifting the head of the screw after the filter 11 has been cleaned or replaced. Then the piston automatically returns to its FIG. 3 position by restoration of the balanced fluid pressure in chambers 33 and 36.

FIGS. 5 and 6 show modified locking means for retaining the piston 30 in its FIG. 4 position for activating the signal means when the filter is not functioning efficiently. Instead of using the locking means 45 including the spring plate 46 and screw 48, there may be substituted a spring metal plate 50 having a cut out downturned tongue 51, in which the tongue 51 functions to cooperate with the annular groove 49 in the piston 30 to hold the piston in signal-giving position until the filter has been cleaned or replaced. The plate 50 is secured to the piston housing 24 by screw 52.

Another modification of the locking means is shown in FIG. 7, where a spring metal plate 55 has a downturned end 56 designed to engage the groove 49, and a spring 57 between the opposite end of the plate 55 and the housing 24. Between said ends the plate is mounted on a screw 58 fastened to the housing 24 at its end 59. When it is desired to release the locking means, the spring 57 may be manually depressed, thereby raising the downturned end 56 from engagement with the groove 49 of the piston, permitting the piston to return to its FIG. 3 position as soon as the fluid flow through filter 11 is again normal and balanced pressure restored to the chambers 33 and 36.

Figure 9:
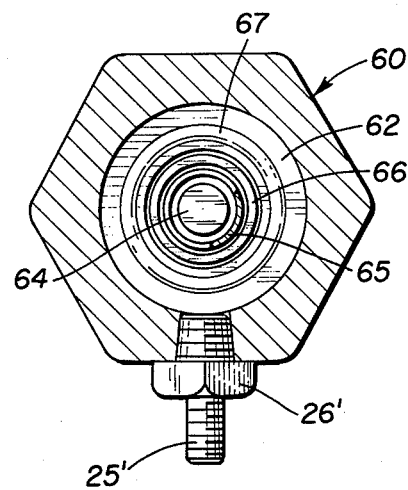
FIG. 9 is a transverse vertical sectional view in the plane of the line 9—9 of FIG. 8.

Referring to the modification shown in FIGS. 8 and 9, the piston 30, with piston seals 31 and 34, is movable longitudinally in the housing 60 as heretofore described, but the housing 60 differs from the housing 24 of FIGS. 3 and 4 in certain respects. The fluid intake line 21' and the fluid outlet line 25' (FIG. 8) enter the housing 60 at the side of the housing instead of at the ends as in FIGS. 1–4. The fluid line 21' is connected to the housing 60 at 23' and the fluid line 25' is connected to said housing at 26' to communicate with the end chambers 33 and 36 previously described.

The ends 61 and 62 of the housing 60 are provided with a threaded aperture for reception of screw bolts 63, 64, which extend into the chambers 33 and 36, respectively, the inner end of each screw bolt engaging a compression spring 65 which has a cap 66 on its outer end. The screw bolts extend through the caps 66 a short distance into the springs 65. The inner ends of the springs bear on the piston ends which are slightly indented at 30' for that purpose. The bolts 63, 64, have slotted outer ends for engagement by a screw driver for adjusting the spring compression. This construction provides a means for setting the signal device to respond to different degrees of clogging of the filter, as may be best suited for each particular installation.

The housing 60 includes another modification. When the piston 30 has been moved toward the end wall 62 by unbalanced fluid pressure in chambers 33 and 36, it is necessary to provide means for preventing close contact between the piston end and the housing end 62 in order to avoid obstructing entry of fluid into the chamber 36 when it is desired to move the piston in the opposite direction. For this purpose the end wall 62 may be provided with an annular rib 67 on its inner surface which spaces the piston from the end wall. Obviously, the annular rib 67 could be formed on the piston end facing the end wall 62. To be effective, the rib 67 has transverse slots or apertures.

When the signal is installed in a fluid line which employs air, it is necessary to provide a port to atmosphere between the piston seals. When the signal is installed in a fluid line which employs liquid, the port 68 serves to drain excess to a vessel (not shown).

FIG. 10 shows the contour of the groove 49 in the piston 30. The groove side surfaces preferably have converging inclined surfaces 70 extending downwardly to straight side surfaces 71 joined by a flat bottom surface 72. This configuration assures holding of the lock pin 48 in the groove when it is desired to maintain the piston in signalling position as heretofore explained.

I claim:

1. A signal device for detecting the condition of a fluid line filter and for automatically giving a locked-in signal when the filter needs cleaning or replacement, comprising
   a. a piston housing and a piston longitudinally movable in the housing, the piston normally being spaced from the inner surfaces of opposite ends of the housing, said piston having an annular groove between its ends,
   b. a fluid line having a filter therein, and pressurized fluid intake and outlet lines communicating with the filter, said pressurized fluid passing through the filter,
   c. a fluid line connecting the pressurized fluid intake line to one end of the piston housing and a fluid line connecting the pressurized fluid outlet line to the opposite end of the piston housing for permitting passage of fluid to opposite ends of the piston housing, and
   d. signal means activated by fluid pressure in the piston housing when the piston has been moved toward one end of the housing by unbalanced pressure in the housing resulting from reduced volume of fluid passing through the filter, and
   e. locking means for retaining the piston in the position in which the signal is activated, said locking means being responsive only to movement of the piston into signal giving position, said locking means comprising a spring metal plate fastened to the piston housing and a pin extending from the plate through the housing into contact with the groove in the piston preventing movement of the piston while in contact therewith.

2. A signal device attachment for a fluid line provided with a filter for passage of pressurized fluid through the filter, said filter being connected to pressurized fluid intake and outlet lines, said signal device comprising
   a. a piston housing and a piston longitudinally movable in the housing, the piston normally being spaced from the inner surfaces of opposite ends of the housing to provide a high pressure and a low pressure chamber, respectively, in the housing, said piston being provided with an annular groove,
   b. a fluid line communicating with the high pressure chamber and having means for connection to the filter intake line, and a fluid line communicating with the low pressure chamber and having means for connection to the filter outlet line, and c. signal means activated by fluid pressure in the high pressure chamber when the piston has been moved to the low pressure chamber by unbalanced pressure in the chambers resulting from reduced volume of fluid passing through the filter, and d. locking means automatically actuated only by movement of the piston into piston engagement for retaining the piston in signal activating position, said locking means comprising a spring metal plate fastened to the piston housing and a pin extending from the plate through the housing into contact with the groove in the piston preventing movement of the piston while in contact therewith.

3. A signal device for detecting the condition of a fluid line filter and for automatically giving a signal when the filter needs cleaning or replacement, comprising a. a piston housing and a piston longitudinally movable in the housing, the piston normally being spaced from the inner surfaces of opposite ends of the housing, b. a fluid line having a filter therein, and pressurized fluid intake and outlet lines communicating with the filter, said pressurized fluid passing through the filter, c. a fluid line connecting the pressurized fluid intake line to one end of the piston housing and a fluid line connecting the pressurized fluid outlet line to the opposite end of the piston housing for permitting passage of fluid to opposite ends of the piston housing, and d. signal means activated by fluid pressure in the piston housing when the piston has been moved toward one end of the housing by unbalanced pressure in the housing resulting from reduced volume of fluid passing through the filter, e. said piston housing having a smaller internal diameter at one end portion and larger internal diameter at the opposite end portion, and the piston has opposite end portions which slidably contact said respective smaller diameter and larger diameter portions of the housing, the space between the smaller diameter end of the piston and the inner surface of the housing end wall providing a high pressure chamber, and the space between the larger diameter end of the piston and the inner surface of the opposite end wall of the housing providing a low pressure chamber when an unbalanced fluid flow into opposite end chambers exists, and f. manually adjustable means for varying the pressures required in the opposite end chambers to actuate the piston.

4. The signal device defined by claim 3, in which the adjustable means comprises a compression spring in each of said chambers bearing on the piston end and having a cap on its outer end, and a screw extending through the housing end and bearing on the cap for compressing the spring.

5. a signal device attachment for a fluid line provided with a filter for passage of pressurized fluid through the filter, said filter being connected to pressurized fluid intake and outlet lines, said signal device comprising a. a piston housing and a piston longitudinally movable in the housing, the piston normally being spaced from the inner surfaces of opposite ends of the housing to provide a high pressure and a low pressure chamber, respectively, in the housing, b. a fluid line communicating with the high pressure chamber and having means for connection to the filter intake line, and a fluid line communicating with the low pressure chamber and having means for connection to the filter outlet line, and c. signal means activated by fluid pressure in the high pressure chamber when the piston has been moved to the low pressure chamber by unbalanced pressure in the chambers resulting from reduced volume of fluid passing through the filter, and d. manually adjustable means for varying the pressures required in the opposite end chambers to actuate the piston.

6. The signal device attachment defined by claim 5, in which the adjustable means comprises a compression spring in each of said chambers bearing on the piston end and having a cap on its outer end, and a screw extending through the housing end and bearing on the cap for compressing the spring.

* * * * *